UNITED STATES PATENT OFFICE.

JOHN D. OLCOTT, OF YPSILANTI, MICHIGAN.

CATARRH REMEDY.

SPECIFICATION forming part of Letters Patent No. 236,071, dated December 28, 1880.

Application filed October 8, 1880. (No specimens.)

*To all whom it may concern:*

Be it known that I, JOHN D. OLCOTT, of Ypsilanti, in the county of Washtenaw and State of Michigan, have invented an Improvement in Catarrh Remedy or Medical Compounds, of which the following is a specification.

The nature of my invention relates to a new and useful discovery for the cure of catarrh; and the invention or discovery consists in the preparation of a snuff or pulverized compound composed of the following ingredients:

Take one pound of the Indian or wild turnip root, one pound of the root of what is ordinarily termed "skunk's cabbage," one pound of sugar, (refined preferred,) one-half ounce of gum-camphor, and one ounce of borax. These ingredients are thoroughly dried, finely ground, and thoroughly mixed together.

This compound is used as snuff, and experience shows that it is an effectual cure for even the worst cases of catarrh.

The borax, however, may be omitted entirely without departing from the spirit of my discovery.

What I claim as my invention is—

A medical compound composed of Indian-turnip root, skunk-cabbage, sugar, and gum-camphor, in about the proportions described.

JOHN DEMMING OLCOTT.

Witnesses:
H. S. SPRAGUE,
ALBERT WAHL.